(12) United States Patent
An

(10) Patent No.: US 6,973,125 B2
(45) Date of Patent: Dec. 6, 2005

(54) APPARATUS FOR DETECTING DATA TRANSMISSION RATE AND CHANGE THEREOF, AND METHOD THEREFOR

(75) Inventor: Cheol-hong An, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 815 days.

(21) Appl. No.: 09/775,464

(22) Filed: Feb. 5, 2001

(65) Prior Publication Data

US 2001/0040919 A1    Nov. 15, 2001

(30) Foreign Application Priority Data

May 13, 2000    (KR) ................................ 2000-25618

(51) Int. Cl.[7] ........................... H04B 17/00; H04B 3/46
(52) U.S. Cl. ..................................... 375/225; 375/224
(58) Field of Search ............................. 375/200, 225, 375/224, 227, 316, 354

(56) References Cited

U.S. PATENT DOCUMENTS

| | | | | |
|---|---|---|---|---|
| 4,887,280 A | * | 12/1989 | Reisenfeld | 375/377 |
| 5,612,966 A | * | 3/1997 | Lee | 714/814 |
| 5,657,347 A | * | 8/1997 | Mori | 375/225 |
| 5,825,761 A | * | 10/1998 | Tanaka et al. | 370/333 |
| 6,167,079 A | * | 12/2000 | Kinnunen et al. | 375/225 |

* cited by examiner

Primary Examiner—Chieh M. Fan
Assistant Examiner—Jason M. Perilla
(74) Attorney, Agent, or Firm—Sughrue Mion, PLLC

(57) ABSTRACT

An apparatus and a method for detecting a data transmission rate by recognizing an amount of real-time transmitted data and a changed amount of the data so as to allocate an appropriate bandwidth required to transmit/receive data in a system in which a serial bus such as an IEEE 1394 is implemented, are provided. The apparatus includes a data transmission rate detecting unit for bit stream data; a sampler; a low-pass filter for low-pass filtering a value sampled by the sampler; an error detecting unit for detecting an error value in the data transmission rate; a first comparing unit for comparing the error value detected by the error detecting unit with a reference error level; an estimated data transmission rate output unit for outputting an estimated data transmission rate; and a second comparing unit for outputting the estimated data transmission rate, for efficient bandwidth operation of the serial bus.

19 Claims, 4 Drawing Sheets

APPARATUS FOR DETECTING DATA TRANSMISSION RATE AND CHANGE THEREOF, AND METHOD THEREFOR

BACKGROUND OF THE INVENTION

1. Field of the Invention

The present invention relates to an apparatus for detecting a data transmission rate and a method thereof, and more particularly, to an apparatus for automatically detecting a data transmission rate and a method thereof in a system using a data transmission line such as an IEEE 1394 bus. The present application is based on Korean Patent Application No. 00-25618, which is incorporated herein by reference.

2. Description of the Related Art

An IEEE 1394 bus as a new, high-performance serial bus has characteristics such as a low price, a high speed, the use of a small number cable, and simple connection, etc. In particular, the IEEE 1394 bus supports an isochronous protocol for real-time processing of digital data transmitted between devices. The data transmission rate of the IEEE 1394 bus is 100~400 Mbps. Thus, the IEEE 1394 bus is important as one method of connecting to many peripheral devices and systems having a large amount of data processing, such as a camcorder, scanner, camera, picture conference, and video on demand (VOD) system.

However, the devices connected to the IEEE 1394 bus are used by dividing the isochronous bandwidth allocated by maximum 100 μs. Thus, there can be devices in which all of the allocated bandwidth is not used and to which the maximum bandwidth is allocated. In a case where there are many devices as above, the bandwidth of the IEEE 1394 bus is inefficiently operated. That is, although all of the bandwidth of the IEEE 1394 bus is not busy, a phenomenon that the bandwidth is not allocated to another device can occur. The phenomenon can limit the maximum number of devices which are capable of being connected to the IEEE 1394 bus.

Thus, in order to efficiently utilize the bandwidth of the IEEE 1394 bus, preferably, the optimum bandwidth is allocated to devices connected to the IEEE 1394 bus. For this purpose, exact bit rates for each device must be estimated in real time.

SUMMARY OF THE INVENTION

To solve the above problems, it is an object of the present invention to provide an apparatus for detecting a data transmission rate by recognizing an amount of real-time transmitted data so as to allocate an appropriate bandwidth required to transmit/receive data in a system in which a serial bus, such as an IEEE 1394, is used.

Accordingly, to achieve the above object, there is provided an apparatus for detecting a data transmission rate through a serial bus. The apparatus includes a data transmission rate detecting unit for detecting a data transmission rate of bit stream data transmitted through a predetermined transmission line; a sampler for sampling a data transmission rate detected by the data transmission rate detecting unit at a predetermined period; a low-pass filter for low-pass filtering a value sampled by the sampler; an error detecting unit for detecting an error value in the data transmission rate of the transmitted bit stream data using the value sampled by the sampler and the low-pass filtered value; a comparing unit for comparing the error value detected by the error detecting unit with a reference error level; and an estimated data transmission rate output unit for outputting an estimated data transmission rate on the basis of the low-pass filtered value when the error value is smaller than the reference error level.

It is another object of the present invention to provide an apparatus for detecting a data transmission rate and a method therefor, which are capable of detecting a data transmission rate by recognizing the changed amount of real time transmitted data.

In order to achieve the above object, there is provided an apparatus for detecting a data transmission rate through a serial bus after a bandwidth for the serial bus is allocated to a system. The apparatus includes a data transmission rate detecting unit for detecting a data transmission rate of bit stream data transmitted through a predetermined transmission line; a sampler for sampling a data transmission rate detected by the data transmission rate detecting unit at a predetermined period; a low-pass filter for low-pass filtering a value sampled by the sampler; an error detecting unit for detecting an error value in the data transmission rate of the transmitted bit stream data using the value sampled by the sampler and the low-pass filtered value; a first comparing unit for comparing the error value detected by the error detecting unit with a reference error level; an estimated data transmission rate output unit for outputting an estimated data transmission rate on the basis of the low-pass filtered value when the error value is smaller than the reference error level; and a second comparing unit for comparing the estimated data transmission rate with an upper bound and a lower bound so as to notify whether the estimated data transmission rate output from the estimated data transmission rate output unit exists between the upper bound and the lower bound set by a user according to the allocated bandwidth and to determine whether the estimated data transmission rate is output.

Furthermore, there is provided a method for detecting a data transmission rate transmitted through a serial bus. The method comprises the steps of: (a) detecting a data transmission rate of bit stream data transmitted through a predetermined transmission line; (b) detecting an error in the data transmission rate at a first predetermined period using the detected data transmission rate; (c) comparing the error with a reference error level; (d) checking the present operation mode when the error is smaller than the reference error level; (e) outputting an estimated data transmission rate for the first predetermined period using the data transmission rate when the present operation mode is a transmit/receive average mode; and (f) outputting the estimated data transmission rate for the first predetermined period in a case where the estimated data transmission rate for the first predetermined period does not exist between a predetermined upper bound and a predetermined lower bound when the present operation mode is a transmit/receive tracking mode.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
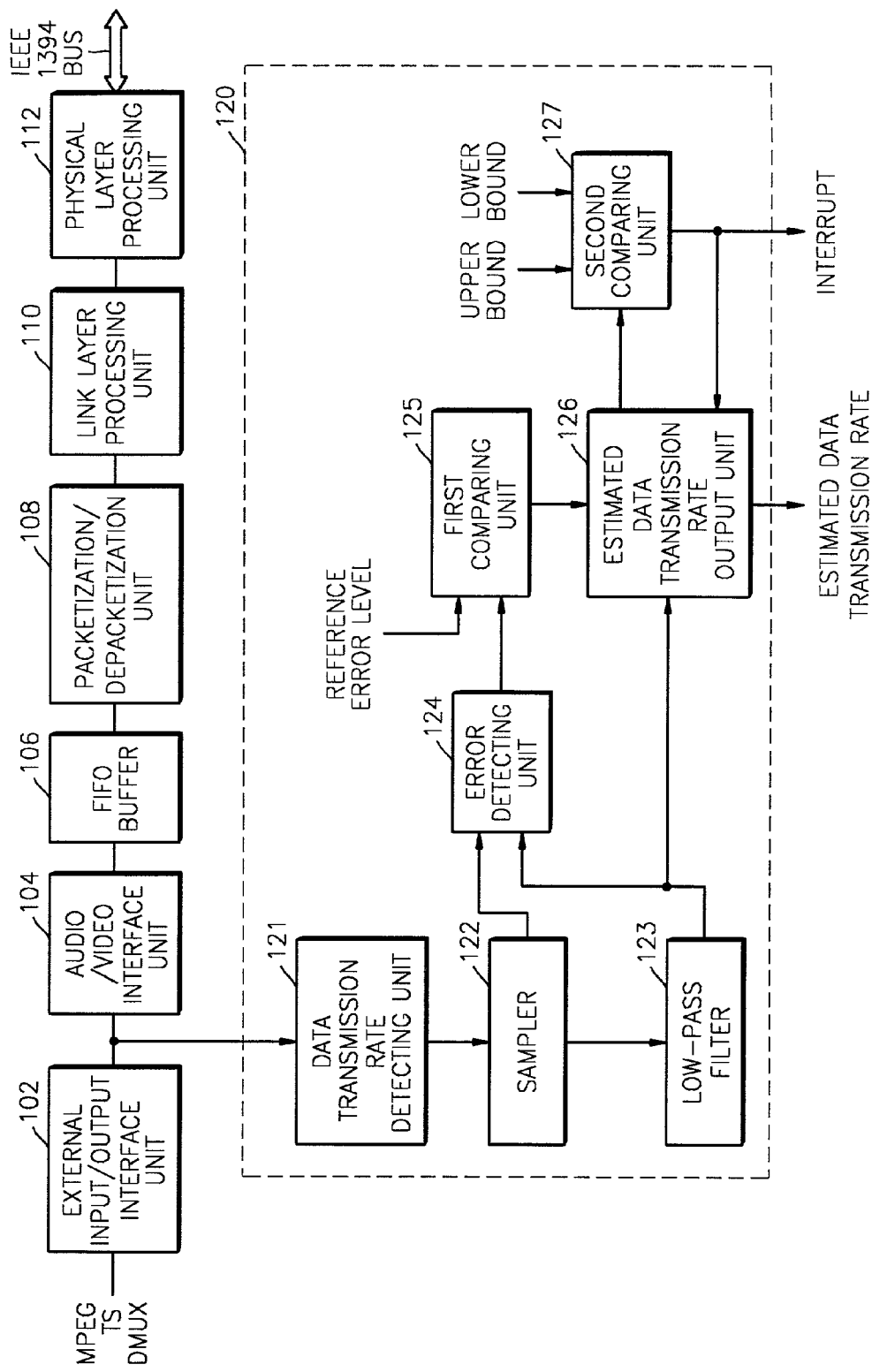
FIG. 1 is a block diagram of a system in which a preferred embodiment of an apparatus for detecting a data transmission rate according to the present invention is implemented.

Referring to FIG. 1, a system employing an apparatus for detecting a data transmission rate according to the present invention includes an external input/output interface unit 102, an audio/video interface unit 104, a first-in first-out (FIFO) buffer 106, a packetization/depacketization unit 108, a link layer processing unit 110, a physical layer processing unit 112, and an apparatus for detecting a data transmission rate 120 according to the present invention.

The external input/output interface unit 102 interfaces with an MPEG transport stream (TS) demultiplexer and converts an external clock to a system clock. The audio/video interface unit 104 inserts a 10-byte distributed system service (DSS) header and a time stamp into data when data are transmitted through an IEEE 1394 bus, and removes the 10-byte DSS header and processes delay of a packet or reads the data within a designated time by comparing the time stamp with a cycle timer when the data is received from the IEEE 1394 bus.

The FIFO buffer 106 receives and transmits the data and has the form of a dual port RAM. The packetization/depacketization unit 108 packetizes the data by inserting a packet header into the data transmitted through the IEEE 1394 bus and depacketizes the data received from the IEEE 1394 bus and converts a clock for interface with a link. The link layer processing unit 110 processes a link layer for transmitting/receiving packetized data. The physical layer processing unit 112 performs physical matching with the IEEE 1394 bus.

The apparatus for detecting a data transmission rate 120 shown in FIG. 1 includes a data transmission rate detecting unit 121, a sampler 122, a low-pass filter 123, an error detecting unit 124, a first comparing unit 125, an estimated data transmission rate output unit 126, and a second comparing unit 127. The apparatus for detecting a data transmission rate 120 is operated by being classified into a transmit/receive average mode for allocating an initial bandwidth and a transmit/receive tracking mode for allocating the bandwidth required to measure the changed amount of the data transmitted at a real time in a state that the bandwidth is allocated.

During the transmit/receive average mode, the data transmission rate detecting unit 121 detects a data transmission rate of the transmitted bit stream data by counting up or down whenever bit steam data in a word unit is transmitted from the external input/output interface unit 102 to the audio/video interface unit 104. Likewise, a detected data transmission rate is cleared according to the sampled period of the sampler 122. Here, the data transmission rate detecting unit 121 may be set to detect the data transmission rate of the bit stream data in a word unit transmitted from the audio/video interface unit 104 to the external input/output interface unit 102. The operation condition is set by a user.

The sampler 122 samples a value detected by the data transmission rate detecting unit 121 at 125 Hz. The sampled value is transmitted to the low-pass filter 123 and the error detecting unit 124, respectively.

Figure 2A:
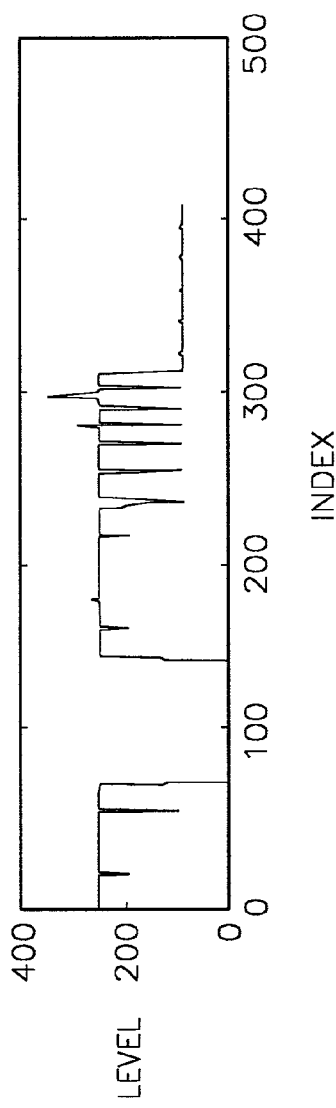
FIGS. 2A and 2B are diagrams illustrating the results of input and output simulation of a low-pass filter shown in FIG. 1.
Figure 2B:
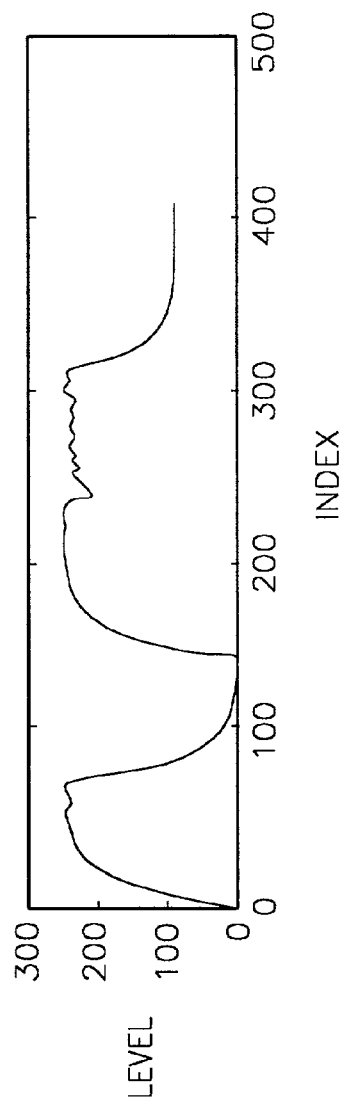

The low-pass filter 123, formed of an infinite impulse response (IIR) filter, low-pass filters the value sampled by the sampler 122. As can be seen from FIGS. 2A and 2B illustrating the results of input and output simulation of a low-pass filter, the low-pass filter 123 is designed to ignore instantaneous change. FIG. 2A is a waveform input to the low-pass filter 123, and FIG. 2B is a waveform output from the low-pass filter 123. The value filtered by the low-pass filter 123 is transmitted to the error detecting unit 124.

The error detecting unit 124 detects an error of one isochronous period for the data transmission rate of the transmitted bit stream data using the sampled value transmitted from the sampler 122 and the filtered value transmitted from the low-pass filter 123. For this purpose, the error detecting unit 124 calculates the sampled value of the one isochronous period by dividing the value sampled by the sampler 122 by 64. This is the reason why the sampled value is sampled at 125 Hz, whereas the one isochronous period is 125 $\mu$s. The filtered value of the one isochronous period is also calculated by dividing the filtered value transmitted from the low-pass filter 123 by 64. Next, an absolute difference between the filtered value of the one isochronous period and the sampled value of the one isochronous period is calculated. The error of the one isochronous period is detected by dividing a calculated absolute difference by the sampled value of the one isochronous period. The detected error of the one isochronous period is transmitted to the first comparing unit 125.

The first comparing unit 125 compares whether the error transmitted from the error detecting unit 124 is smaller than a preset reference error level. Here, the reference error level is set by a user and is set by selecting one of 7 steps considering the accuracy and the processing speed of the data transmission rate to be detected. That is, the user sets the reference error level by selecting one of ½, ¼, ⅛, 1/16, 1/32, 1/64, and 1/128 of the input data transmission rate.

For example, in a case where the reference error level is set to '½', the accuracy of the estimated data transmission rate is lower than that in a case where the reference error level is differently set. However, in this case, the estimated data transmission rate can be obtained faster. On the other hand, in a case where the reference error level is set to '1/128', the accuracy of the estimated data transmission rate is higher than that in a case where the reference error level is differently set. However, in this case, it takes more time to obtain the estimated data transmission rate than when the error level is differently set. As a result of comparing by the first comparing unit 125, in a case where the detected error is smaller than the reference error level, the first comparing unit 125 outputs a comparison result signal so that the estimated data transmission rate may be output from the estimated data transmission rate output unit 126.

The estimated data transmission rate output unit 126 outputs the estimated data transmission rate according to the compared result provided from the first comparing unit 125. The estimated data transmission rate is a filtered value of one isochronous period calculated by dividing the filtered value transmitted from the low-pass filter 123 by 64. Since the present operation mode is a transmit/receive average mode, the estimated data transmission rate output unit 126 outputs the estimated data transmission rate to the outside. As a result, an initial bandwidth is allocated to a corresponding device on the basis of the estimated data transmission rate. When the allocation of the bandwidth is performed by a bus manager (not shown) of the IEEE 1394 bus, the estimated data transmission rate is transmitted to the bus manager. Likewise, the estimated data transmission rate output to the outside is transmitted to a device related to the allocation of the bandwidth of the corresponding device. Here, before the estimated data transmission rate is transmitted to the device, the user can recognize the estimated data transmission rate.

However, in a case where the present operation mode is a tracking mode, the data transmission rate detecting unit 121, the sampler 122, the low-pass filter 123, the error detecting unit 124, and the first comparing unit 125 perform the same operations as those in the case of the transmit/receive average mode. The estimated data transmission rate output unit 126 also performs the same estimation of the data transmission rate as that in the case of the transmit/receive average mode. However, when the data transmission rate is estimated, the data transmission rate is output to the second comparing unit 127 before being output to the outside.

The second comparing unit 127 compares a preset upper bound and a preset lower bound with the estimated data transmission rate when the estimated data transmission rate is applied. This is to check whether the estimated data transmission rate does not exist between the upper bound and the lower bound. The value of the upper bound and the lower bound is set by the user. The user determines the value of the upper bound and the lower bound on the basis of the data transmission rate measured during the average mode. The estimated data transmission rate satisfying the comparison condition in the first comparing unit 125 is used to ignore the estimated data transmission rate which does not exist between the upper bound and the lower bound before reaching a stable state (or an average state).

The second comparing unit 127 provides an output control signal to the estimated data transmission rate output unit 126, while generating an interrupt to the outside in a case where the estimated data transmission rate does not exist between the upper bound and the lower bound. The estimated data transmission rate output unit 126, controlled by the output control signal, outputs the estimated data transmission rate to the outside. However, in a case where the estimated data transmission rate exists between the upper bound and the lower bound, the change of a corresponding bandwidth is unnecessary. Thus, the second comparing unit 127 repeatedly compares the estimated data transmission rate provided from the estimated data transmission rate output unit 126 with the upper bound and the lower bound. Here, the estimated data transmission rate output unit 126 does not output the estimated data transmission rate to the outside. The output estimated data rate is provided to a device in which the bandwidth allocated to the corresponding device can be varied. When a bus manager (not shown) of the IEEE 1394 bus can vary the bandwidth allocated to the device, the estimated data transmission rate is transmitted to the bus manager. Here, before the estimated data transmission rate is transmitted to the device such as the bus manager, the user can recognize the estimated data transmission rate.

Figure 3:
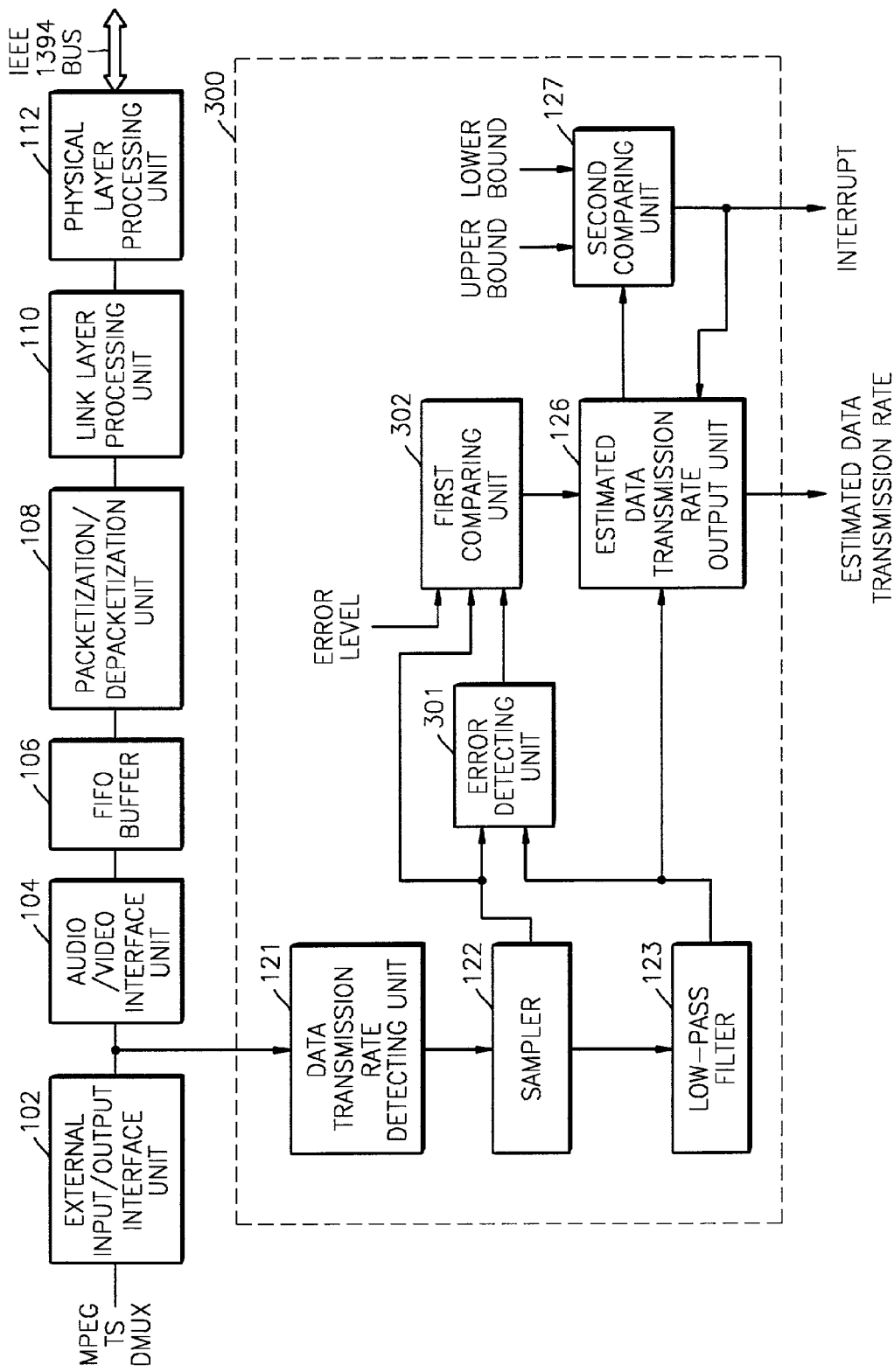
FIG. 3 is a block diagram of a system in which another preferred embodiment of an apparatus for detecting a data transmission rate according to the present invention is implemented.

Referring to FIG. 3, all function blocks excluding an error detecting unit 301 and a first comparing unit 302 in another embodiment of an apparatus for detecting a data transmission rate 300 are the same as those shown in FIG. 1. Thus, to avoid redundancy, the operations of only the error detecting unit 301 and the first comparing unit 302 will be described.

As shown in FIG. 1, when a value sampled at 125 Hz is output from the sampler 122, the sampled value is low-pass filtered and output from the low-pass filter 123, and the error detecting unit 301 detects the error of one isochronous period. For this purpose, the error detecting unit 301 calculates the sampled value of the one isochronous period by dividing the sampled value by 64 and calculates the low-pass filtered value of the one isochronous period by dividing the low-pass filtered value by 64. An absolute difference between the calculated low-pass filtered value and the sampled value is detected as an error value of the one isochronous period. The detected error value is transmitted to the first comparing unit 302.

The first comparing unit 302, like in the first comparing unit 125 of FIG. 1, sets a value in which one of 7 error levels set by the user is multiplied by the sampled value of the one isochronous period calculated by dividing the sampled value provided from the sampler 122 by 64, as the reference error level. The reference error level is compared with the error transmitted from the error detecting unit 301. As a result of comparison, when the error provided from the error detecting unit 301 is smaller than the set reference error level, the output control signal is output to the estimated data transmission rate output unit 126. As a result, the estimated data transmission rate output unit 126 outputs the data transmission rate estimated according to the operation mode set as in FIG. 1 to the outside or the second comparing unit 127.

Figure 4:
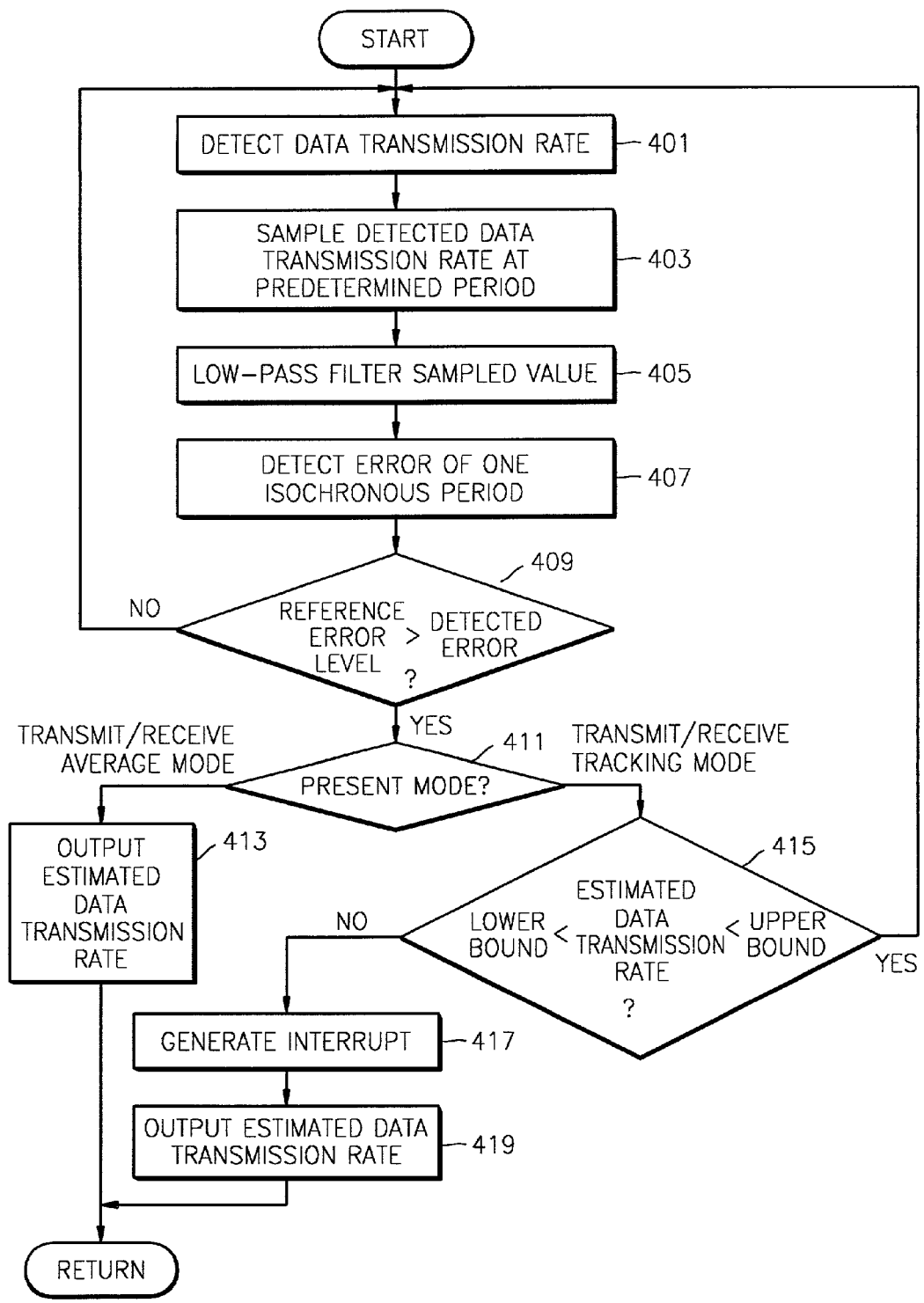
FIG. 4 is a flow chart illustrating a method for detecting a data transmission rate according to the present invention.

Referring to FIG. 4, the data transmission rate transmitted through a predetermined transmission line is detected (step 401). A method for detecting the date transmission rate is the same as that described with reference to the data transmission rate detecting unit 121 of FIG. 1. The transmission line exists between the external input/output interface unit 102 and the audio/video interface unit 104 of FIG. 1 and is a line for transmitting data to or from the EEE 1394 bus.

The data transmission rate detected in step 401 is sampled at a predetermined period (step 403). The predetermined frequency is 125 Hz, as described for the sampler 122 of FIG. 1. The sampled data transmission rate is low-pass filtered (step 405).

The error of one isochronous period is detected using the value sampled in step 403 and the value low-pass filtered in step 405 (step 407). A method for detecting the error is the same as that described with reference to the error detecting unit 124 of FIG. 1. When the error is detected, it is checked whether the detected error is smaller than the reference error level (step 409). The reference error level is set by the user as described in FIG. 1, or using a resultant value in which the error level set by the user and the sampled value is operated on, as described in FIG. 3.

As a result of checking in step 409, when the detected error is not smaller than the reference error level, the operation returns to step 401, and then, the above steps are repeated. However, as a result of checking in step 409, when the detected error is smaller than the reference error level, the present mode is checked (step 411).

As a result of checking in step 411, when the present mode is a transmit/receive average mode, the estimated data transmission rate is output to a device (not shown) for setting the bandwidth of a corresponding device (step 413). The estimation of the data transmission rate is performed as described with reference to the estimated data transmission rate output unit 126 of FIG. 1.

Meanwhile, when the present mode is a transmit/receive tracking mode, it is checked whether the estimated data transmission rate exists between the lower bound and the upper bound (step 415). The lower bound and the upper bound are set by the same condition as described with reference to FIG. 1.

As a result of checking in step 415, when the estimated data transmission rate exists between the lower bound and the upper bound, the operation returns to step 401, and then, the above steps are repeated. However, when as a result of checking in step 415, the estimated data transmission rate does not exist between the lower bound and the upper bound, an interrupt is generated (step 417). The interrupt requires the change of the allocated bandwidth. Thus, the interrupt is supplied to a bus manager (not shown) for the IEEE 1394 bus or to a device for changing the bandwidth of the corresponding device. The estimated data transmission rate is output so as to be supplied to the device (step 419). The estimation of the data transmission rate is performed as in step 413.

As described above, the present invention is used to allocate the appropriate bandwidth to a corresponding device by exactly detecting the date transmission rate of one isochronous period according to the transmit/receive average mode and the transmit/receive tracking mode in real time, and then can operate the bandwidth of the IEEE 1394 bus efficiently and more devices can be connected to the IEEE 1394 bus than in the prior art.

This invention has been particularly described with reference to preferred embodiments thereof; however, it is not limited to the preferred embodiments and various changes may be made by those skilled in the art without departing from the spirit and scope of the invention as defined by the appended claims.

What is claimed is:

1. An apparatus for detecting a data transmission rate transmitted through a serial bus comprising a predetermined transmission line, the apparatus comprising:
   a data transmission rate detecting unit for detecting the data transmission rate of bit stream data transmitted through the predetermined transmission line;
   a sampler for sampling the data transmission rate detected by the data transmission rate detecting unit at a predetermined interval;
   a low-pass filter for low-pass filtering a value sampled by the sampler to produce a first low-pass filtered value;
   an error detecting unit for detecting and outputting an error value in the data transmission rate of the transmitted bit stream data using a value output by the sampler and the first low-pass filtered value;
   a comparing unit for comparing the error value output by the error detecting unit with a reference error level; and
   an estimated data transmission rate output unit for outputting an estimated data transmission rate based on the first low-pass filtered value when the error value is smaller than the reference error level.

2. The apparatus for detecting a data transmission rate according to claim 1, wherein the error detecting unit is formed to detect an error value of one isochronous period, the comparing unit is formed to compare the error value of the one isochronous period with the reference error level, and the estimated data transmission rate output unit is formed to output an estimated data transmission rate of the one isochronous period, in a case where the serial bus is an IEEE 1394 bus.

3. The apparatus for detecting a data transmission rate according to claim 2, wherein the error detecting unit is formed to calculate a low-pass filtered value of the one isochronous period from the first low-pass filtered value, to calculate a sampled value of the one isochronous period from the value output by the sampler, and to divide an absolute difference between the low-pass filtered value of the one isochronous period and the sampled value of the one isochronous period by the sampled value of the one isochronous period.

4. The apparatus for detecting a data transmission rate according to claim 2, wherein the comparing unit sets one reference error level selected from a plurality of reference error levels by a user as the reference error level.

5. The apparatus for detecting a data transmission rate according to claim 2, wherein the error detecting unit is formed to calculate a low-pass filtered value of the one isochronous period from the first low-pass filtered value, to calculate a sampled value of the one isochronous period from the value output by the sampler, and to divide an absolute difference between the low-pass filtered value of the one isochronous period and the sampled value of the one isochronous period by the sampled value of the one isochronous period; and
   wherein the comparing unit sets a value obtained when one reference error level selected by a user from a plurality of reference error levels is multiplied by the sampled value of the one isochronous period, as the reference error level, and is formed to compare the error value of the one isochronous period with the reference error level.

6. The apparatus for detecting a data transmission rate according to claim 2, wherein the estimated data transmission rate output unit calculates a low-pass filtered value of the one isochronous period from the first low-pass filtered value and outputs the low-pass filtered value of the one isochronous period as the estimated data transmission rate.

7. The apparatus for detecting a data transmission rate according to claim 2, wherein the low-pass filter is an infinite impulse response (IIR) low-pass filter.

8. The apparatus for detecting a data transmission rate according to claim 1, wherein the predetermined transmission line is a line between an external input/output interface unit for interfacing with an MPEG transport stream (TS) demultiplexer and an audio/video interface unit.

9. The apparatus for detecting a data transmission rate according to claim 1, wherein the apparatus detects the data transmission rate in a word unit, and a predetermined sampling frequency is set to 125Hz.

10. An apparatus for detecting a data transmission rate through a serial bus comprising a predetermined transmission line after a bandwidth for the serial bus is allocated to a system, the apparatus comprising:
    a data transmission rate detecting unit for detecting the data transmission rate of bit stream data transmitted through the predetermined transmission line;
    a sampler for sampling the data transmission rate detected by the data transmission rate detecting unit at a predetermined interval;
    a low-pass filter for low-pass filtering a value output by the sampler to produce a first low pass filtered value;
    an error detecting unit for detecting and outputting an error value in the data transmission rate of the transmitted bit stream data using the value output by the sampler and the first low-pass filtered value;
    a first comparing unit for comparing the error value output by the error detecting unit with a reference error level;
    an estimated data transmission rate output unit for outputting an estimated data transmission rate based on the first low-pass filtered value when the error value is smaller than the reference error level; and
    a second comparing unit for comparing the estimated data transmission rate with an upper bound and a lower bound to notify whether the estimated data transmission rate output from the estimated data transmission rate output unit exists between the upper bound and the lower bound set by a user according to the allocated bandwidth and to determine whether the estimated data transmission rate is output.

11. The apparatus for detecting a data transmission rate according to claim 10, wherein the second comparing unit generates an interrupt for notifying whether the estimated data transmission rate output from the estimated data transmission rate output unit exists between the upper bound and the lower bound and an output control signal to the estimated data transmission rate output unit so as to output the estimated data transmission rate, in a case where the estimated data transmission rate does not exist between the upper bound and the lower bound.

12. The apparatus for detecting a data transmission rate according to claim 10, wherein the error detecting unit is formed to detect an error value of one isochronous period, the first comparing unit is formed to compare the error value of the one isochronous period with the reference error level, and the estimated data transmission rate output unit is formed to output an estimated data transmission rate of the one isochronous period, in a case where the serial bus is an IEEE 1394 bus.

13. The apparatus for detecting a data transmission rate according to claim 10, wherein the predetermined transmission line is a line between an external input/output interface unit for interfacing with an MPEG transport stream (TS) demultiplexer and an audio/video interface unit.

14. A method for detecting a data transmission rate through a serial bus comprising a predetermined transmission line, the method comprising the steps of:
   (a) detecting the data transmission rate of bit stream data transmitted through the predetermined transmission line;
   (b) detecting an error in the data transmission rate at a first predetermined interval using the detected data transmission rate;
   (c) comparing the error with a reference error level;
   (d) checking present operation mode when the error is smaller than the reference error level;
   (e) outputting an estimated data transmission rate for the first predetermined interval as the data transmission rate when the present operation mode is a transmit/receive average mode; and
   (f) outputting the estimated data transmission rate for the first predetermined interval as the data transmission rate in a case where it is determined that the estimated data transmission rate for the first predetermined period does not exist between a predetermined upper bound and a predetermined lower bound when the present operation mode is a transmit/receive tracking mode.

15. The method for detecting a data transmission rate according to claim 14, wherein the step (b) comprises the steps of:
   (b1) sampling the detected data transmission rate at a first predetermined frequency;
   (b2) filtering a sampled value output in the step (b1) by using low-pass filtering to produce a first low pass filtered value; and
   (b3) detecting the error in the data transmission rate of the bit stream data using the sampled value and the first low-pass filtered value in the step (b2).

16. The method for detecting a data transmission rate according to claim 15, wherein the reference error level in the step (c) is one reference error level selected from a plurality of reference error levels by a user, or a value resulting from performing a predetermined operation on the one selected reference error level and the sampled value.

17. The method for detecting a data transmission rate according to claim 15, wherein the step (a) is performed in a word unit, the first predetermined period is one isochronous period, and the first predetermined frequency is 125Hz, in a case where the serial bus is an IEEE 1394 bus.

18. The method for detecting a data transmission rate according to claim 15, wherein the first low-pass filtered value of the first predetermined period detected in the step (b2) is output as the estimated data transmission rate in the steps (e) and (f).

19. The method for detecting a data transmission rate according to claim 14, wherein the predetermined upper bound and the predetermined lower bound in the step (f) are determined on the basis of the estimated data transmission rate output in the step (e), and the step (f) further comprises the step of notifying whether the estimated data transmission rate exists between the predetermined upper bound and the predetermined lower bound.

* * * * *